United States Patent [19]
Hu et al.

[11] Patent Number: 6,063,721
[45] Date of Patent: May 16, 2000

[54] DRY REGENERATION-DEMETALIZATION TECHNIQUE FOR CATALYST FOR RESIDUUM AND/OR HEAVY OIL CATALYTIC CRACKING

[75] Inventors: Yihou Hu; Baolin Luo; Kuiyuan Sun; Qiye Yang; Mingli Gong; Jiyu Hu; Guoping Fang; Yulong Li, all of Beijing, China

[73] Assignees: China Petro-Chemical Corporation; Institute of Chemical Metallurgy Academia Sinica; Sinopec Beijing Design Institute (BDI), all of Beijing, China

[21] Appl. No.: 09/073,586

[22] Filed: May 6, 1998

[30]     Foreign Application Priority Data

Jun. 5, 1997 [CN] China .................................. 97109778

[51] Int. Cl.[7] ...................................................... B01J 20/34
[52] U.S. Cl. .................................. 502/34; 502/53; 502/56
[58] Field of Search .................................. 502/34, 53, 56

[56]          References Cited

U.S. PATENT DOCUMENTS 4,293,403  10/1981  Burk, Jr. et al. ......................... 208/120

*Primary Examiner*—John F. Niebling
*Assistant Examiner*—Alexander G. Ghyka
*Attorney, Agent, or Firm*—Alston & Bird LLP

[57]                ABSTRACT

This invention provides a novel dry chemical process for removing by carbonylation the metals harmful to the catalyst activity from the catalyst for the residuum and/or heavy oil catalytic cracking, comprising: contacting the catalyst contaminated by the poisonous metals with an activation gas and a reduction gas in a reactor for activation and reduction; and then in a carbonylation reactor, contacting the catalyst treated by activating and reducing with CO gas to make the metals on the catalyst carbonylated to form gaseous metal carbonyls which are then transferred and separated from the solid catalyst, thereby the catalyst activity is restored. The process of this invention is simple in the technology, moderate in the operation conditions, and it will not cause secondary pollution to environment for there is no addition and discharge of any liquid.

27 Claims, 1 Drawing Sheet

DRY REGENERATION-DEMETALIZATION TECHNIQUE FOR CATALYST FOR RESIDUUM AND/OR HEAVY OIL CATALYTIC CRACKING

FIELD OF THE INVENTION

This invention relates to a dry regeneration-demetalization technique for the catalyst for residuum and/or heavy oil catalytic cracking. More particularly, the invention relates to a process of regeneration of a metal contaminated catalyst, comprising: activating, reducing and carbonylating the metal contaminated catalyst by a dry chemical process, to convert poisonous metal compounds deposited on said catalyst, which is destructive to the catalyst activity, into gaseous metal carbonyl compounds, which are then transferred and removed from the catalyst, and thereby restoring the catalyst activity partially at least for reuse.

BACKGROUND OF THE INVENTION

In the secondary processing technology of petroleum refining, the processing technology of fluid catalytic cracking (FCC) is highly regarded by refiners for its advantages of being able to treat feedstocks of inferior quality reasonably and economically, to produce gasoline having high octane number and bring in high economic benefits. In the past, the feedstocks used were mostly the gas oils produced from vacuum distillation, but over the recent decade, owing to the rise in crude oil price and crude oil per se tending to be heavier and so on, the refiners have turned more to processing or blending and refining of bottom oil from atmosphere distilling tower or residuum produced from the bottom of vacuum distilling tower in order to utilize the crude oil more effectively, get higher economic benefits and produce more light liquid oil products at the same consumption of crude oils. However, the metals, such as more nickel and a little iron and the like, are concentrated in the residuum and heavy oils, during catalytic cracking of the residuum and heavy oil, poisoning the catalyst for residuum and heavy oil catalytic cracking, thus causing the catalyst activity, as well as the light oil yield, to decrease. In order to maintain the activity of the catalyst at a certain level, the severely deactivated catalyst should be discharged at regular intervals, while making up large amounts of fresh catalyst. But, the catalyst is more expensive, about 2000 US dollars per ton, and the environment will be polluted by the piling-up metal contaminated catalyst. If the catalyst is regenerated for reuse, it will not only save a large sum of money from purchasing the catalyst and disposing the metal contaminated catalyst but also reduce the environment pollution.

In U.S. Pat. No. 4,293,403 (filed on Jan. 3, 1977, by Emmett H. Burk. Jr., et al.), a wet process for treatment of the metal contaminated catalyst is disclosed to demetalize such as nickel, iron and/or vanadium from the metal contaminated catalyst, comprising mainly three technological processes:

(1) sulfurizing:
   Introducing hydrogen sulfide in a concentration of at least about 20% (v/v) into the metal contaminated catalyst under the conditions of a temperature of 500~1700° F. (260~926° C.) and a pressure (partial pressure of gas containing sulfur) of 0.05~3 MPa for a period of ¼~20 hours, to convert the compounds of nickel and the like on the catalyst into metal sulfides;

(2) oxidizing:
   After treated by sulfurization, the catalyst is oxidized under the conditions of a temperature of 600~700° F. (316~372° C.) and a partial pressure of oxygen of 0.2~3 MPa for 25 minutes to convert the metal sulfides into soluble metal sulfates, sulfites, thiosulfates and simple sulfides;

(3) washing:
   Adding sulfurous acid, sulfuric acid, nitric acid, hydrochloric acid, hydrogen peroxide and a large amount of water to the catalyst which has been treated by oxidation, and washing repeatedly.

However, the process has to be carried out at a high temperature and in a corrosive medium containing sulfur compounds during the sulfurization, and also in a high concentration of $H_2S$ (at least 20% (v/v)), therefore the requirements of material quality and corrosion resistance for the apparatuses are critical; furthermore, since the chemical agents with strong acidity and corrosivity, such as $HNO_3$, $HCl$, $H_2SO_4$, $H_2O_2$ etc., have to be used, a waste liquor is turned out from washing, and thus a secondary pollution to the environment occurs, while the production cost will be increased and the active elements-rare earth oxides on the catalyst will be impaired.

Therefore, people are seeking to develop a novel process for treating and demetalizing the metal contaminated catalyst, which must be simple in technological process, not critical about the material quality of the apparatuses and not harmful to the active elements of the catalyst, and wherein no liquid is to be added and discharged and thereby no secondary pollution to the environment will occur.

SUMMARY OF THE INVENTION

Therefore, the present invention provides a novel dry chemical process for removing by carbonylation the metals harmful to the catalyst activity from the catalyst for residuum and/or heavy oil catalytic cracking, comprising:

In an activation and reduction reactor, the catalyst contaminated by poisonous metals is contacted with an activation gas and a reduction gas, so that the poisonous metal compounds deposited on the catalyst are activated by the activation gas, then reduced to metal simple substances under the action of the reduction gas; and In a carbonylation reactor, the catalyst treated by activating and reducing is contacted with carbon monoxide gas to make the metal simple substances on the catalyst carbonylated to form gaseous metal carbonyls which are then transferred, separated from the solid catalyst, and discharged from the reactor, thereby the activity of the catalyst is restored.

Further, the present invention provides a technological process, wherein the metal compounds harmful to the catalyst activity are removed from the catalyst for the residuum and/or heavy oil catalytic cracking by carbonylation in gaseous phase, so as to restore the catalyst activity partially at least to allow the catalyst to be reused in the residuum and/or heavy oil catalytic cracking, and to recover the metals, while recycling and reusing the carbon monoxide, and said process comprises mainly:

In the activation and reduction reactor, the catalyst contaminated by poisonous metals is contacted with the activation and reduction gases, so that the poisonous metal compounds deposited on the catalyst are activated by the activation gas, then reduced to metal simple substances under the action of the reduction gas;

In the carbonylation reactor, the catalyst treated by activating and reducing is contacted with carbon monoxide gas to make the metal simple substances on the catalyst carbonylated to form gaseous metal carbonyls which are then transferred, separated from the solid catalyst and discharged from the reactor, thereby the activity of the catalyst is restored for reuse; and The discharged metal carbonyls gas is introduced into a thermal decomposition reactor and treated at a reaction temperature of 200~300° C. and a pressure of 0.03~0.5 MPa (gauge) for 0.5~12 hours to get the gaseous metal carbonyls decomposed to carbon monoxide gas and solid metals, then the carbon monoxide is recycled back to the carbonylation reactor for reuse, and the metals are recovered.

DETAILED DESCRIPTION OF THE INVENTION

Figure 1:
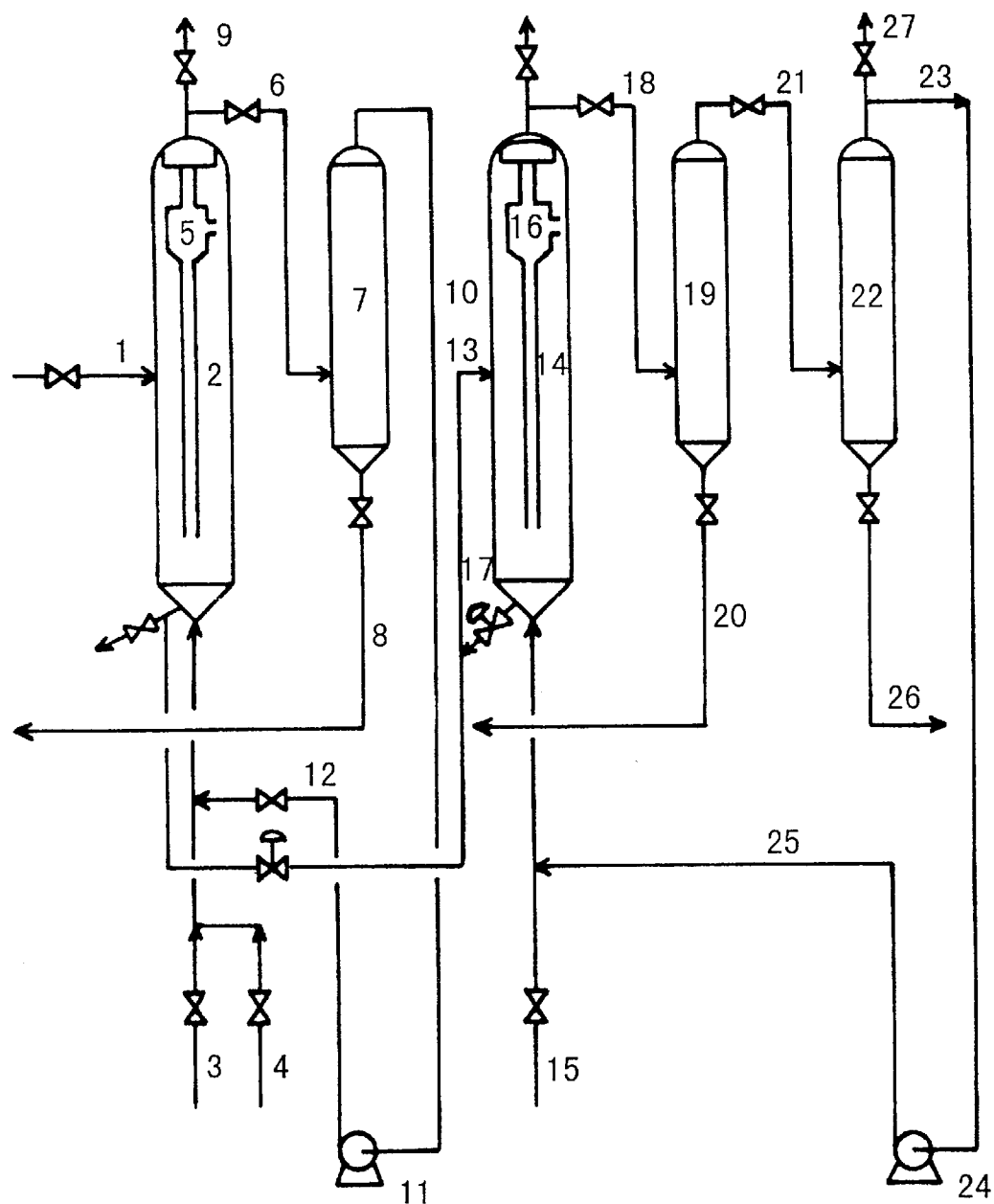
FIG. 1 shows a flow diagram of a preferred embodiment of this invention for regenerating the catalyst, recovering the metal nickel and recycling the carbon monoxide for reuse, by removing in gas phase the nickel metal compounds harmful to the activity of the catalyst from the residuum and/or heavy oil catalytic cracking catalyst.

This invention relates to a novel dry chemical process for removing by carbonylation the metals harmful to the catalyst activity from the catalyst for the residuum and/or heavy oil catalytic cracking, said process comprises:

In the activation and reduction reactor, the catalyst contaminated by poisonous metals is contacted with an activation gas and a reduction gas, so that the poisonous metal compounds deposited on the catalyst are activated by the activation gas, then reduced to metal simple substances under the action of the reduction gas; and In the carbonylation reactor, the catalyst treated by activating and reducing is contacted with carbon monoxide gas to make the metal simple substances on the catalyst carbonylated to form gaseous metal carbonyls which are then transferred, separated from the solid catalyst, and discharged from the reactor, thereby the activity of the catalyst is restored.

Further, the invention provides a technological process wherein the metal compounds harmful to the catalyst activity are removed from the catalyst for the residuum and/or heavy oil catalytic cracking by carbonylation in gaseous phase, so as to restore the catalyst activity partially at least to allow the catalyst to be reused in the residuum and/or heavy oil catalytic cracking, and to recover the metals, while recycling and reusing the carbon monoxide, and said process comprises mainly:

In the activation and reduction reactor, the catalyst contaminated by poisonous metals is contacted with the activation gas and the reduction gas, so that the poisonous metal compounds deposited on the catalyst are activated by the activation gas, then reduced to metal simple substances under the action of the reduction gas;

In the carbonylation reactor, the catalyst treated by activating and reducing is contacted with carbon monoxide gas to make the metal simple substances on the catalyst carbonylated to form gaseous metal carbonyls which are then transferred, separated from the solid catalyst, and discharged from the reactor, thereby the activity of the catalyst is restored for reuse; and The discharged metal carbonyls gas is introduced into a thermal decomposition reactor, and treated at a reaction temperature of 200~300° C. and a pressure of 0.03~0.5 MPa (gauge) for 0.5~12 hours to get the gaseous metal carbonyls decomposed to carbon monoxide gas and solid metals, then the carbon monoxide is recycled back to the carbonylation reactor for reuse, and the metals are recovered;

The metals harmful to the catalyst activity referred to herein include the metals which can react with carbon monoxide to form metal carbonyls, for example, these may be nickel and possible iron, but mainly nickel.

In the catalytic cracking of residuum and/or heavy oil, from the point of view of economic benefits, it is generally desirable for refiners to maintain the microreaction activity of an equilibrium catalyst at the lowest level no less than 60 m %, preferably, no less than about 65 m %; the level of nickel deposited on the equilibrium catalyst should be no more than 8,000 ppm, preferably 3,000~5,000 ppm, otherwise, it will be necessary to discharge the metal contaminated catalyst, and to remove excessive nickel so as to restore the catalyst activity, or make up fresh catalyst. The contaminated catalyst is burnt in a coke-burning regenerator with an oxygen-containing gas at a high temperature (710~760° C.), thus nickel oxides can be formed.

As the catalyst carrier contains alumina and nickel oxides exhibit stronger basicity, alumina will exhibit acidity when it meets a strongly basic material at high temperature, so it may possibly form nickel aluminate. It has been identified that nickel presents in the form of +2 and +3 valent oxides and of nickel aluminate ($NiAl_2O_4$) on the surface and in the pore of the equilibrium catalyst, by testing the nickel distribution on the equilibrium catalyst with an EDAX-9100 Electron Probe and the nickel morphology with a PHI-610 Auger Electron Spectrometer respectively. In this invention, the reaction of the nickel deposited in element state on the catalyst with carbon monoxide is utilized to form gaseous complex-nickel carbonyls which are then transferred and separated from the catalyst, thereby the catalyst activity is restored. However, because carbon monoxide reacts chemically only with nickel simple substance, it is necessary to reduce nickel oxide to nickel simple substance prior to being carbonylated. The result was not better when the nickel oxide was reduced only using reductive gas under the conditions of high temperature and high pressure. Considering the property of nickel which has a higher affinity for sulfur, the activation and reduction are carried out under the conditions of a given temperature and pressure and strongly reductive atmosphere using a sulfur-containing gas, an unexpected result has been obtained that the nickel oxides are reduced rapidly to nickel simple substance by the reductive gas in a very short time when nickel binding with sulfur and breaking away from oxygen and/or aluminate radical, thus providing advantageous conditions for the carbonylation of nickel in the next step.

For the purpose of this invention, said residuum referred to herein means a residual oil from the bottom of a vacuum distilling tower, and said heavy oil means an oil from the bottom of an atmosphere distilling tower.

The catalysts used for residuum and/or heavy oil catalytic cracking are generally ultrastable-Y type (USY) zeolite catalysts and/or co-Y type zeolite catalyst, while the ultrastable-Y type zeolite catalyst is preferred. The catalyst carrier is $Al_2O_3$.

said activation gas is a reductive sulfur-containing gas selected from hydrogen sulfide and sulfur dioxide, while hydrogen sulfide is preferred.

Said reduction gas is selected from hydrogen, carbon monoxide and mixture thereof, while hydrogen is preferred.

In the activation and reduction reaction, the volume ratio of the activation gas to the reduction gas is about 0.5:99.5~10:90, preferably 2:98~6:94.

In a preferred embodiment of the invention, the activation gas is hydrogen sulfide and reduction gas is hydrogen; the volume ratio of hydrogen sulfide to hydrogen is 5:95.

The reaction temperature of activation and reduction is in the range of 300~600° C., preferably 400~500° C.; the reaction pressure is in the range of 0.1~1.0 MPa(gauge), preferably 0.15~0.9 MPa (gauge); the reaction time is 0.5~12 hours, preferably 2~5 hours.

In the carbonylation reaction, the concentration of carbon monoxide is 20~99% (v/v), preferably 30~98% (v/v), with the remainder being hydrogen.

Hydrogen sulfide, hydrogen and carbon monoxide used in the invention can be obtained in the processes of desulfurization, stripping of sour waste, concentrating hydrogen, reforming and preparing hydrogen etc.

The temperature of carbonylation reaction is in the range of 70~150° C., preferably 80~140° C., the reaction pressure is in the range of 0.05~0.95 MPa(gauge), preferably 0.1~0.85 MPa(gauge); the reaction time is 2~24 hours, preferably 4~10 hours.

The reaction temperature of the step for thermal decomposition of metal carbonyls is in the range of 200~300° C., preferably 230~270° C.; the reaction pressure is in the range of 0.03~0.5 MPa(gauge), preferably 0.08~0.4 MPa(gauge); the reaction time is 0.5~12 hours, preferably 1~5 hours.

The carbon monoxide from thermal decomposition of the metal carbonyl complexes can be returned to the carbonylation reactor for reuse through a recycle compressor so as to reduce material consumption. During the treatment, it is only necessary to make up CO at regular intervals to make up for its loss.

Said regeneration of the metal contaminated catalyst in the invention by removing the poisonous metals from the metal contaminated catalyst discharged during the residuum and/or heavy oil catalytic cracking may be carried out in the field of a refinery, and the metal contaminated catalysts discharged from various refineries can be also collected for treatment together.

The metal contaminated catalyst regenerated according to the process of this invention has a maximum nickel content up to about 15000 ppm and a microreaction activity of about 59.9 m %. After being denickeled, the catalyst provides a denickeling proportion of about 60%, and a microreaction activity of about 64~70.7 m %, increased by about 4.1~10.8 percentage points over that before being treated.

The active element-rare earth oxides impregnated on the catalyst and the structure of the catalyst will not be impaired by the regeneration by removing poisonous metals according to the process of the invention.

EXAMPLE

The feedstock was a contaminated catalyst discharged from the residuum catalytic cracking unit of the Tianjin No.1 Petro-Chemical Plant, being a mixed catalyst comprising the ultrastable-Y type zeolite (purchased from the Lanzhou Catalyst Factory, Gansu Province), co-Y-15 type zeolite (purchased from the Changling Catalyst Factory, Hunan Province) and CRC-1 catalyst (purchased from Zhoucun Catalyst Factory, Shandong Province) in a tatio of 1:1:1. The nickel content of the catalyst was about 15000 ppm and microreaction activity was 59.9 m %. The reactor used was a vertical cylindrical reactor with a low speed fluidized bed. The apparent linear velocity of gas was 0.005~0.2 m/s, preferably 0.01~0.1 m/s. The feedstock was fed into the activation and reduction reactor 2 with low speed fluidized bed via line 1, while $H_2S$ was introduced via line 3 and hydrogen via line 4 respectively to provide a volume ratio of $H_2S$ to $H_2$ being 5:95. The activation and reduction reaction was carried out at a temperature of 470° C. and a pressure of 0.2 MPa(gauge) for 4 hours, the catalyst fines escaped from above the fluidized bed were recovered in a cyclone 5 and recycled back to the bed. The $H_2S$ and $H_2$ were discharged to a degassing buffer tank 7 via line 6, and catalyst particles settled in small amounts were periodically recycled via line 18 back to the feedstock tank (not shown in the Figure). When there were excessive impurities in the recycled activation and reduction gases, they were vented at intervals through line 9, and the removed activation and reduction gases were introduced into recycle compressor 11 via line 10, then back to the activation and reduction reactor via line 12 for reuse. The contaminated catalyst, after being activated and reduced, was fed into the low speed fluidized bed reactor 14 via line 13, while CO in a concentration of 95% (v/v) (with the remainder being hydrogen) was introduced via line 15 to carry out the carbonylation reaction at a reaction temperature of 100° C. and a pressure of 0.15 MPa(gauge) for 8 hours to make the nickel simple substance reacted with CO, and thereby forming gaseous $Ni(CO)_4$. The catalyst fines escaped from above the fluidized bed were recovered via a cyclone 16 back to the bed, the denickeled catalyst was fed to product tank (not shown in the Figure) via line 17. The gas from the top of the reactor 14 was introduced into the degassing buffer tank 19 via line 18, and the small amount of catalyst particles entrained therein was recycled via line 20 back to the feedstock tank (not shown in the Figure). The gas removed from the top was fed via line 21 into a nickel carbonyl thermal decomposition reactor 22, wherein when the gaseous nickel carbonyl was heated to 240° C., the reaction was carried out under a pressure of 0.1 MPa(gauge) for 4 hours to decompose the gaseous $Ni(CO)_4$ to solid metallic nickel and CO gas. The CO gas was recycled via line 23 and through a recycle compressor 24 and then via line 25 back to the carbonylation reactor for reuse, and the solid metallic nickel settled was passed through line 26 to be recovered. The gas with an excessive accumulation of impurities was vented at intervals via line 27.

The denickeled catalyst provides a denickeled proportion of about 60% and microreaction activity of about 64~70.7 m %.

Practical Applicability and Advantages

1. The process of this invention is a dry chemical process, wherein it is not required to add and discharge any liquid during the whole process, and the CO is recycled back for reuse, thereby no secondary pollution occurs to the environment.

2. The process of the invention can operate in the presence of a corrosive medium of sulfur-containing compound at a maximum temperature of 600° C., preferably 400~500° C.(for the activation and reduction process), so it is less critical about the material quality of apparatuses, pipes, valves and the like.

3. The concentration of the corrosive gas $H_2S$ used in the process of the invention is low, about 10% (v/v) at the maximum, the operation conditions are moderate, and it is easy to meet the requirements of material quality of the apparatuses, pipes, valves and the like.

4. The maximum operation pressure used in the process of the invention is 1.0 MPa(gauge), these apparatuses are subjected to a low pressure, so it is easy for industrial application.

5. The materials used in the process of the invention are simple, only three kinds of materials are used in whole process, i.e., $H_2S$ (low concentration), $H_2$ and CO, and the materials can be obtained at moderate cost in the course of processing of oil products.

6. The operation conditions of the process of the invention are moderate without impairing the active elements-rare earth oxides impregnated on the catalyst, even more without breaking the catalyst matrix.

To sum up, the process of the invention has a simple technological procedure, moderate operation conditions and non-severe requirements of material quality of the apparatuses, pipes and valves etc.; in the process of the invention the active elements on the catalyst and the skeleton of the catalyst are not impaired; no liquid is added and also no waste liquor is discharged, so no secondary pollution to environment will occur; furthermore the materials used are quite simple and easily available; and the cost is low too.

What is claimed is:

1. A dry chemical process for removing harmful metals from a catalyst for residuum and/or heavy oil catalytic cracking, comprising:

contacting the catalyst with an activation gas and a reduction gas to activate said harmful metals and convert the activated harmful metals into metal simple substances;

carbonylating said metal simple substances in the catalyst by contacting said catalyst with a carbon monoxide to form a gaseous metal carbonyl; and discharging said gaseous metal carbonyl and thereby reactivating said catalyst.

2. The process according to claim 1, wherein said metals harmful to the catalyst activity include nickel and/or iron.

3. The process according to claim 1, wherein said activation gas is a sulfur-containing reductive gas selected from hydrogen sulfide and sulfur dioxide.

4. The process according to claim 1, wherein said reduction gas is selected from hydrogen, carbon monoxide and the mixture thereof.

5. The process according to claim 1, wherein said activation gas is hydrogen sulfide, and said reduction gas is hydrogen.

6. The process according to claim 1, wherein the volume ratio of the activation gas to the reduction gas is 0.5:99.5–10:90.

7. The process according to claim 1, wherein the reaction temperature of the activation and reduction is in the range of reduction 300–600° C., the reaction pressure is in the range of 0.1–1.0 MPa(gauge) and the reaction time is 0.5–12 hours.

8. The process according to claim 1, wherein in the carbonylation reaction, the concentration of CO is 20–99% (vol.), the reaction temperature is in the range of 70–150° C., the reaction pressure is in the range of 0.05–0.95 MPa (gauge) and the reaction time is 2–24 hours.

9. The process according to claim 1, wherein the process further comprises a step of thermally-decomposing the metal carbonyls for recovering the metals and recycling carbon monoxide for reuse.

10. The process according to claim 2, wherein said activation gas is a sulfur-containing reductive gas selected from hydrogen sulfide and sulfur dioxide.

11. The process according to claim 2, wherein said reduction gas is selected from hydrogen, carbon monoxide and the mixture thereof.

12. The process according to claim 2, wherein said activation gas is hydrogen sulfide, and said reduction gas is hydrogen.

13. The process according to claim 2, wherein the volume ratio of the activation gas to the reduction gas is 0.5:99.5–10:90.

14. The process according to claim 6, wherein the volume ratio of the activation gas to the reduction gas is 2:98–6:94.

15. The process according to claim 13, wherein the volume ratio of the activation gas to the reduction gas is 2:98–6:94.

16. The process according to claim 15, wherein the reaction temperature of the activation and reduction is in the range of reduction 300–600° C., the reaction pressure is in the range of 0.1–1.0 MPa(gauge) and the reaction time is 0.5–12 hours.

17. The process according to claim 7, wherein the reaction temperature of the activation and reduction is in the range of 400–500° C., the reaction pressure is in the range of 0.15–0.9 MPa(gauge) and the reaction time is 2–5 hours.

18. The process according to claim 16, wherein the reaction temperature of the activation and reduction is in the range of 400–500° C., the reaction pressure is in the range of 0.15–0.9 MPa(gauge) and the reaction time is 2–5 hours.

19. The process according to claim 18, wherein in the carbonylation reaction, the concentration of CO is 20–99% (vol.), the reaction temperature is in the range of 70–150° C., the reaction pressure is in the range of 0.05–0.95 MPa (gauge) and the reaction time is 2–24 hours.

20. The process according to claim 8, wherein in the carbonylation reaction, the concentration of CO is 30–98% (vol.), the reaction temperature is in the range of 80–140° C., the reaction pressure is in the range of 0.1–0.85 MPa(gauge) and the reaction time is 4–10 hours.

21. The process according to claim 19, wherein in the carbonylation reaction, the concentration of CO is 30–98% (vol.), the reaction temperature is in the range of 80–140° C., the reaction pressure is in the range of 0.1–0.85 MPa(gauge) and the reaction time is 4–10 hours.

22. The process according to claim 21, wherein the process further comprises a step of thermally-decomposing the metal carbonyls for recovering the metals and recycling carbon monoxide for reuse.

23. The process according to claim 9, wherein the reaction temperature is in the range of 230–270° C., the pressure is in the range of 0.08–0.4 MPa(gauge) and the reaction time is 1–5 hours.

24. The process according to claim 22, wherein the reaction temperature is in the range of 230–270° C., the pressure is in the range of 0.08–0.4 MPa(gauge) and the reaction time is 1–5 hours.

25. The process according to claim 9, wherein said step of thermally-decomposing the metal carbonyls further comprises the steps of introducing into a thermal decomposition reactor the discharged gas of metal carbonyls to decompose thermally the gaseous metal carbonyls into carbon monoxide gas and solid metals under the conditions of a reaction temperature of 200–300° C., a pressure of 0.03–0.5 Mpa (gauge) and a reaction time of 0.5–12 hours, recycling the CO back to the carbonylation reactor for reuse, and recovering the metals.

26. The process according to claim 22, wherein said step of thermally-decomposing the metal carbonyls further comprises the steps of introducing into a thermal decomposition reactor the discharged gas of metal carbonyls to decompose thermally the gaseous metal carbonyls into carbon monoxide gas and solid metals under the conditions of a reaction temperature of 200–300° C., a pressure of 0.03–0.5 Mpa (gauge) and a reaction time of 0.5–12 hours, recycling the CO back to the carbonylation reactor for reuse, and recovering the metals.

27. The process of claim 1, further comprising:

collecting said gaseous metal carbonyl; and decomposing said gaseous metal carbonyl into solid metals and carbon monoxide.

* * * * *

UNITED STATES PATENT AND TRADEMARK OFFICE
CERTIFICATE OF CORRECTION

PATENT NO.    : 6,063,721
DATED         : May 16, 2000
INVENTOR(S)   : Hu et al

It is certified that error appears in the above-identified patent and that said Letters Patent is hereby corrected as shown below:

<u>Title Page</u>,
Item [30] should read –May 6, 1997--

Signed and Sealed this

Third Day of July, 2001

*Attest:*

NICHOLAS P. GODICI
*Attesting Officer*  *Acting Director of the United States Patent and Trademark Office*